Patented Oct. 25, 1949

2,485,989

UNITED STATES PATENT OFFICE 2,485,989

PROCESS FOR CONVERTING LOWER-BOILING ALDEHYDES INTO HIGHER-BOILING ALDEHYDES

Everet Foy Smith, Terre Haute, Ind., assignor to Commercial Solvents Corporation, Terre Haute, Ind., a corporation of Maryland No Drawing. Application February 9, 1946, Serial No. 646,721

15 Claims. (Cl. 260—601)

This invention relates to a process for converting lower-boiling aldehydes into higher-boiling aldehydes by treatment with hydrogen in the presence of an alkaline condensation catalyst and a palladium hydrogenation catalyst. More particularly, it relates to a single-step method for condensing, dehydrating, and hydrogenating lower-boiling aliphatic aldehydes in the presence of an alkaline condensation catalyst and a palladium hydrogenation catalyst to produce higher-boiling aldehydes. In one specific embodiment, the invention comprises reacting butyraldehyde with hydrogen in the presence of aqueous potassium hydroxide and 5% palladium on charcoal under superatmospheric pressure and at a temperature in the range of about 0 to 250° C. to produce 2-ethylhexaldehyde and minor quantities of other higher-boiling aldehydes.

The condensation of aldehydes such as acetaldehyde to give hydroxy aldehydes such as aldol is a well-known reaction. The subsequent dehydration of the hydroxy aldehyde to give unsaturated aldehydes, such as crotonaldehyde, is also well-known, and selective hydrogenation of the resulting olefinic bond may be carried out by a number of methods, disclosed in the literature, to give the corresponding saturated higher aldehydes, such as butyraldehyde.

I have now discovered that the foregoing series of reactions may be carried out in one operation by subjecting the original aldehyde to the action of hydrogen at superatmospheric pressures in the presence of an alkaline condensation catalyst and a hydrogenation catalyst comprising palladium. It will be obvious to those skilled in the art that my process offers many advantages over the processes now in use, since in a single-step process the handling of materials is reduced to a minimum, heat economy is facilitated, the isolation of the intermediate compounds is avoided, and the processing time is greatly shortened. Moreover, my process is capable of producing substantially greater overall yields, based on the original aldehyde, than in the prior art.

The aldehydes employed as the charging stock in my process are chosen from the group consisting of the lower-boiling aliphatic aldehydes having not less than two carbon atoms per molecule, and preferably not more than six carbon atoms per molecule. As examples of such aldehydes may be cited acetaldehyde, propionaldehyde, butyraldehyde, and valeraldehyde. Complex products are formed when two or more aldehydes are processed simultaneously; and by a suitable choice of starting materials, products having a wide range of properties may be obtained.

The condensation catalyst may be chosen from a large field of alkaline compounds comprising the following types and examples: ammonia; amines, such as isopropylamine, diisopropylamine, trimethylamine, furfurylamine, difurfurylamine, and aniline; alkali-metal hydroxides; alkaline-earth-metal oxides and hydroxides; and alkali-metal salts of weak acids, such as sodium borate, carbonate, acetate, and phosphates. These condensation catalysts vary considerably in effectiveness. I have found potassium hydroxide to be one of the best, particularly when used in the form of a dilute aqueous solution.

In carrying out my process, I have unexpectedly found it advantageous to add water to the mixture of aldehyde and condensation catalyst, despite the fact that the presence of water would normally be expected to oppose the dehydration of the hydroxy aldehyde, which is thought to be an essential step in my process. The presence of the water is believed to help in producing a more even dissemination of the condensation catalyst throughout the reactant mixture, and to help in preventing over-condensation of a part of the aldehyde through excessive contact with the condensation catalyst.

To my reactant mixture I may also add an organic solvent of a type that tends to promote admixture of the aldehyde with water and the condensation catalyst, and which should be of a type that is not permanently changed during the process. As examples of such solvents may be cited the lower-boiling aliphatic alcohols, such as methanol, ethanol, n-propyl alcohol, and isopropyl alcohol.

The hydrogenation catalyst may consist of pure palladium metal or of palladium oxide, but is preferably prepared in a form comprising palladium on charcoal or other inert carrier by impregnating the carrier with a palladium salt and subsequently reducing prior to use. Other types of hydrogenation catalysts, such as platinum, copper chromite, and Raney nickel, have been found to be inoperative in my process, possibly because they may tend to inhibit the initial condensation and dehydration, or because they may tend to favor the hydrogenation of the aldehyde to the corresponding alcohol.

Hydrogen of a relatively high degree of purity is preferred for use in my process. It need not be absolutely pure, but reactive impurities such as oxygen should be kept as low as possible, and such materials as carbon monoxide, sulfur, and hydrogen sulfide should be excluded altogether, since they tend to cause rapid and serious poisoning of palladium catalysts. Inert impurities such as nitrogen are undesirable because they increase the total pressure in the reaction vessel necessary to maintain the required partial pressure of hydrogen. For this reason, the proportion of inert impurities should be kept as low as possible.

The partial pressure of hydrogen required in my process may range from one atmosphere upward, depending on the temperature employed, but is preferably within the range of about 250 to 2000 pounds per square inch. Lower temperatures require higher pressures; and at higher temperatures, lower pressures may be used satisfactorily.

Temperatures from about 0 to 250° C. may be used. The preferred temperature varies somewhat, depending on the type of aldehyde being processed, the type and concentration of condensation catalyst, the activity of the palladium catalyst, and the partial pressure of hydrogen, but will ordinarily be found to lie within the range of about 20 to 150° C.

My process may be carried out by introducing a mixture of the reactants, solvents, and catalysts into a conventional autoclave equipped with a suitable stirrer and a jacket or coil for maintaining the charge at the proper temperature. Hydrogen is then injected to the desired pressure, and the autoclave is heated to the desired temperature. During the reaction, hydrogen is added either intermittently or continuously as required to maintain the pressure at the desired level. When the hydrogenation has been completed, as evidenced by the cessation of hydrogen absorption, the reaction mixture is cooled, the autoclave is vented, the contents are discharged, and the product is isolated in a known manner.

Alternatively, I may carry out my process by passing a slurry of the powdered catalyst in the liquid reactant mixture through a column in contact with hydrogen gas under proper conditions of temperature and pressure. Or I may pass the reactant mixture through a stationary bed of pelleted or supported catalyst, enclosed in a reaction vessel of suitable design.

The following examples are given to illustrate my invention, and are not to be construed as limiting it to the exact reactants or conditions described:

Example 1

A mixture of 408 g. butyraldehyde, 25 g. potassium hydroxide, and 2 g. 5% palladium on charcoal was introduced into a stainless-steel rocking bomb having a total volume of 1840 ml., and the bomb was sealed and transferred to a rocking unit oscillating at the rate of 37 cycles per minute. Hydrogen was then injected to a pressure of 1000 pounds per square inch, gage, and the bomb was rocked and heated to a temperature of 150° C. The pressure reached a maximum of 1100 pounds per square inch prior to the initiation of the hydrogenation; and as the hydrogenation proceeded, fresh hydrogen was introduced from time to time to restore the pressure to its initial level of 1000 pounds per square inch. A total pressure drop of 475 pounds per square inch took place, most of it at a temperature below 85° C., in a total time of 1.5 hours, at the end of which time the hydrogenation was complete. The bomb was then cooled and emptied, and the product was filtered to remove the catalyst and subsequently fractionally distilled through a laboratory column packed with single-turn glass helices. The following materials were separated: 231 g. 2-ethylhexaldehyde, 17.2 g. of a fraction boiling between 170 and 228° C., and 38 g. of a higher-boiling residue. From these data it was calculated that the 2-ethylhexaldehyde had been produced in 64% yield, based on butyraldehyde.

Example 2

A mixture of 408 g. butyraldehyde, 25 g. potassium hydroxide, 100 ml. distilled water, and 2 g. 5% palladium on charcoal was hydrogenated at a temperature of 30° C. and a pressure of 1000 pounds per square inch as described in Example 1. A total pressure drop of 500 pounds per square inch took place in 1.0 hour. From the product were separated 61 g. butyraldehyde, 166 g. 2-ethylhexaldehyde, 35.9 g. of a fraction boiling from 168 to 250° C., and 30 g. of a higher-boiling residue. From these data it was calculated that the 2-ethylhexaldehyde had been produced in a 46% conversion and a 64% yield, based on butyraldehyde.

I claim as my invention:

1. A process for producing aldehydes from lower-boiling saturated aliphatic aldehydes having not less than two carbon atoms per molecule which comprises heating the lower-boiling aldehydes with hydrogen in the presence of an alkaline condensation catalyst and a hydrogenation catalyst comprising palladium.

2. A process for producing higher-boiling aldehydes which comprises heating with hydrogen a lower-boiling saturated aliphatic aldehyde having not less than two and not more than six carbon atoms per molecule in the presence of an alkaline condensation catalyst and a hydrogenation catalyst comprising palladium.

3. The process of claim 2 in which the reaction is carried out in the presence of water.

4. The process of claim 2 in which the reaction is carried out in the presence of a lower-boiling aliphatic alcohol.

5. The process of claim 2 in which the reaction is carried out in the presence of water and a lower-boiling aliphatic alcohol.

6. A process for producing higher-boiling aldehydes which comprises heating with hydrogen a lower-boiling saturated aliphatic aldehyde having not less than two and not more than six carbon atoms per molecule at a temperature in the range of about 0 to 250° C. and at a pressure above one atmosphere in the presence of an alkaline condensation catalyst and a hydrogenation catalyst comprising palladium.

7. The process of claim 6 in which the lower-boiling aliphatic aldehyde is acetaldehyde.

8. The process of claim 6 in which the lower-boiling aliphatic aldehyde is butyraldehyde.

9. A process for producing 2-ethylhexaldehyde which comprises heating butyraldehyde with hydrogen at a temperature within the range of about 20 to 150° C. and at a pressure above one atmosphere in the presence of an alkaline condensation catalyst and a hydrogenation catalyst comprising palladium on charcoal.

10. A process for producing 2-ethylhexaldehyde which comprises heating butyraldehyde with hydrogen at a temperature within the range of about 20 to 150° C. and at a pressure between about 250 and 2000 pounds per square inch in the presence of a hydrogenation catalyst comprising palladium on charcoal, an alkaline condensation catalyst, and water.

11. A process for producing 2-ethylhexaldehyde which comprises heating butyraldehyde with hydrogen at a temperature within the range of about 20 to 150° C. and at a pressure between about 250 and 2000 pounds per square inch in the presence of a hydrogenation catalyst comprising palladium on charcoal, an alkaline condensation catalyst, and an aliphatic alcohol containing not in excess of three carbon atoms.

12. A process for producing 2-ethylhexaldehyde which comprises heating butyraldehyde with hydrogen at a temperature within the range of about 20 to 150° C. and at a pressure between about 250 and 2000 pounds per square inch in the presence of a hydrogenation catalyst comprising palladium on charcoal, an alkaline condensation catalyst, water, and an aliphatic alcohol containing not in excess of three carbon atoms.

13. The process of claim 12 in which the alkaline condensation catalyst is sodium tetraborate.

14. The process of claim 12 in which the alkaline condensation catalyst is sodium hydroxide.

15. The process of claim 12 in which the alkaline condensation catalyst is potassium hydroxide.

EVERET FOY SMITH.

REFERENCES CITED

The following references are of record in the file of this patent:

UNITED STATES PATENTS

| Number | Name | Date |
| --- | --- | --- |
| 1,724,761 | Holden | Aug. 13, 1929 |
| 1,788,896 | Swallen | Jan. 13, 1931 |
| 2,150,158 | Gallagher et al. | Mar. 14, 1939 |

FOREIGN PATENTS

| Number | Country | Date |
| --- | --- | --- |
| 531,579 | Germany | Aug. 13, 1931 |

OTHER REFERENCES

Alexander et al.: J. A. C. S., 66, pages 886–888 (June 1944).

Eastman Kodak Co., "Synthetic Organic Chemicals," July 1933, vol. VI, No. 5.

Ser. No. 367,231, Kern (A. P. C.), published June 8, 1943.